United States Patent Office 3,155,743
Patented Nov. 3, 1964

3,155,743
COMPOSITIONS OF MATTER CONTAINING POLY-
EPOXIDES AND POLYAMINODIPHENYLSUL-
FONES
Herbert A. Newey, Lafayette, Calif., assignor to Shell Oil
Company, a corporation of Delaware
No Drawing. Filed Dec. 31, 1956, Ser. No. 631,519
14 Claims. (Cl. 260—836)

This invention relates to compositions of matter which can be cured to form products having excellent heat resistance. More particularly, the invention relates to new compositions of matter which can be heat-cured to form useful products, such as laminates, adhesives, pottings and the like, which have outstanding resistance to loss of strength at high temperatures.

Specifically, the invention provides new and particularly useful compositions comprising a mixture containing a polyepoxide having an epoxy value of at least 0.45 eq./100 g. and a polyaminodiphenyl-sulfone. The invention further provides hard insoluble infusible products obtained by heat-curing the above-described products.

There is a growing need in industry for resinous materials that may be used to prepare laminates, electrical castings, adhesives and the like, which have good resistance to deterioration and loss of strength at elevated temperatures. The need is particularly acute in the aircraft and guided missile industry where laminating compositions and metal-to-metal and plastic-to-metal adhesives are needed that can resist temperatures as high as 500° F. and 600° F. Currently available laminating compositions and adhesives are not satisfactory for many of these applications.

It is, therefore, an object of the invention to provide new heat curable compositions and a method for their preparation. It is a further object to provide new compositions containing certain polyepoxides which can be cured to form products having excellent elevated temperature strength. It is still a further object to provide new compositions which may be used in the preparation of heat resistant laminates, adhesives, pottings and the like. It is a further object to provide new compositions which are particularly adapted for use as high temperature adhesives for bonding metal-to-metal and metal-to-plastic. Other objects and advantages of the invention will be apparent from the following detailed description thereof.

It has now been discovered that these and other objects may be accomplished by the new compositions of the invention comprising a mixture of a polyepoxide, and preferably a solid polyepoxide, having an epoxy value of at least 0.45 eq./100 g. and a polyaminodiphenylsulfone, such as 4,4'-diaminodiphenylsulfone. It has been found that these particular compositions can be heat-cured to form hard, insoluble products having excellent heat stability even at temperatures as high as 500° F. and 600° F. and the stability is retained even after long periods of exposure to the high temperatures. The new compositions are particularly valuable in the formation of high temperature adhesives for use in jet aircraft and guided missile manufacture.

One component of the new compositions comprise polyepoxides, and preferably solid polyepoxides, having an epoxy value of at least 0.45 eq./100 g. The expression "polyepoxide" as used herein and in the appended claims refers to those materials having more than one vicepoxy group, i.e., more than one

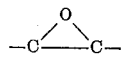

group. The epoxy value is that determined by any standard analytical method. One method comprises heating a one-gram sample of the polyepoxide with an excess of pyridinium chloride dissolved in pyridine at the boiling point for 20 minutes whereby the pyridinium chloride hydrochlorinates the epoxy groups to chlorohydrin groups. The excess pyridinium chloride is then back titrated with 0.1 N sodium hydroxide to phenolphthalein end point. The epoxide value is calculated by considering one HCl as equivalent to one epoxide group. This method is used to obtain all epoxide values reported herein.

Examples of polyepoxides having an epoxy value of at least 0.45 eq./100 g. include, among others, the glycidyl ethers of novolac resins which resins are obtained by condensing an aldehyde with a phenol. A typical member of this class is the epoxy resin from formaldehyde-2,2-bis(4-hydroxyphenyl)propane novolac resin which contains as predominant constituent the substance represented by the formula

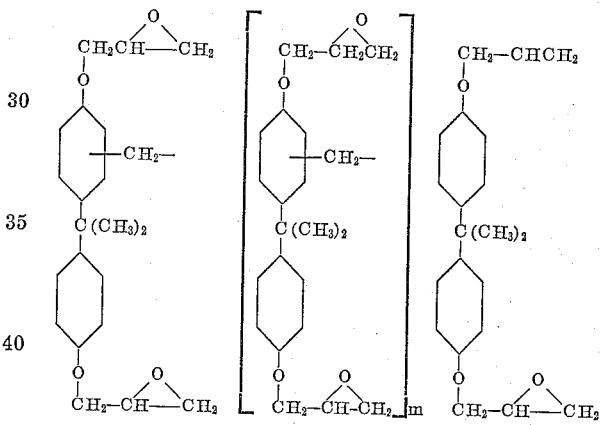

Other examples of this type of polyepoxide and methods for their preparation may be found in German Patent No. 676,117, U.S. Patent Nos. 2,716,099, U.S. 2,658,884, and U.S. 2,658,885.

Another group comprises the glycidyl ethers of tetraphenols which have two hydroxyaryl groups linked to each end of an alphatic hydrocarbon chain, such as the polyglycidyl ethers of alpha,alpha,omega,omega-tetrakis (hydroxyaryl)alkanes as described and claimed in Schwarzer, Serial No. 466,208. Examples of these include among others, the polyglycidyl ether of 1,1,2,2-tetrakis (hydroxy phenyl) ethane, the polyglycidyl ether of 1,1,3,3-tetrakis (hydroxy phenyl) propane and the polyglycidyl ether of 1,1,5,5-tetrakis (hydroxy phenyl) pentane.

Another group comprises the ethers of poly (vic-epoxyhydrocarbyl) substituted monohydric phenols and the glycidyl ethers of epoxyhydrocarbyl-substituted monohydric phenols as described and claimed in copending application Serial No. 577,635, filed April 12, 1956. Examples of these include, among others, 1-propoxy-2,4- di(2,3-epoxypropyl)benzene, 1-propoxy-2,4-di(epoxyethyl)benzene, 1-cyclohexyloxy-2,5-di(3,4-epoxyoctyl)-benzene, 1-allyloxy-2,4,6-tri(2,3-epoxypropyl) benzene, and 1-(2,3-epoxypropoxy)-2-(2,3-epoxypropyl)benzene, 1-(2,3-epoxypropoxy)-2-(epoxyethyl)benzene, 1-(2,3-epoxy-3-epoxypropoxy)-2-(2,3-epoxycyclohexyl)benzene and the like.

Another group comprises the ethers of poly(vic-epoxyhydrocarbyl) substituted polyhydric phenols as described and claimed in copending application Serial No. 627,426, filed December 10, 1956, Patent No. 2,965,608. Examples of these include, among others, 1,4-dipropoxy-2,6-di(2,3-epoxypropyl)benzene, 1,4-dicyclohexyloxy-2,6-di-3,4-epoxyoctyl)benzene, 1,4 - di(2,3 - epoxypropoxy)-2 - epoxypropylbenzene, 1,4 - di(2,3 - epoxypropoxy) - 2, 5-di(epoxypropyl)benzene and the like.

Another group comprises the poly(vic-epoxyhydrocarbyl)substituted aromatic hydrocarbons or halo-substituted aromatic hydrocarbons as described and claimed in copending application Serial No. 622,758, filed November 19, 1956. Examples of these include, among others, 1,4-bis(2,3 - epoxypropyl)benzene, 1,3 - bis(3,4 - epoxyhexyl-benzene, 4,4'-bis(2,3-epoxypropyl)diphenyl and 2,6-bis-(2,3-epoxypropyl)naphthalene and the like.

Still another group comprises the epoxy-containing polymers obtained homopolymerizing or copolymerizing epoxy-containing monomers possessing at least one polymerizable ethylenic linkage. When this type of monomer is polymerized in the substantial absence of alkaline or acidic catalysts, such as in the presence of heat, oxygen, peroxy compounds, actinic light, and the like, they undergo additional polymerization at the multiple bond leaving the epoxy group unaffected. These monomers may be copolymerized with themselves or with other ethylenically unsaturated monomers, such as styrene, vinyl acetate, metacrylonitrile, acrylonitrile, vinyl chloride, vinylidene chloride, methyl acrylate, methyl methacrylate, diallyl phthalate, vinyl allyl adipate, and the like. Illustrative examples of these polymers include, among others, poly-(allyl 2,3-epoxypropyl ether), poly(2,3-epoxypropyl) crotonate), allyl 2,3-epoxpropyl ether-styrene copolymer, methallyl 3,4-epoxybutyl ether allyl benzoate copolymer, poly(vinyl 2,3-epoxypropyl ether) allyl glycidyl ether-vinyl acetate copolymer and poly(4-glycidyloxy-styrene).

Still another group of polyepoxides that may be used in preparing the novel compositions of the present invention include the epoxyalkyl and epoxycycloalkyl ethers of polyhydric alcohols, such as the glycidyl ether of glycerol, glycerol ether of 1,2,6-hexanetriol and the epoxycyclohexyl ether of glycerol. A detailed description of many of these ethers may be found in U.S. 2,538,072 and U.S. 2,581,464. Closely related to this group are the glycidyl ethers of certain polyhydric phenols, such as 2,2-bis(4-hydroxyphenyl)propane.

Another group of polyepoxides include the epoxy esters of polycarboxylic acids, such as di(2,3-epoxybutyl)phthalate, di(2,3 - epoxybutyl)adipate, di(2,3 - epoxybutyl)succinate, di(epoxycyclohexyl)phthalate, and diglycidyl phthalate. Also included in this group are the esters of epoxy alcohols and epoxy acids, such as epoxycyclohexyl-methyl epoxycyclohexanecarboxylate, epoxidized diallyl eicosadienedioate, epoxidized diallyl cyclohexenecarboxylate and the like. A detailed description of many of these esters and their preparation may be found in U.S. 2,761,870, U.S. 2,716,123 and copending application Serial No. 397,011, filed December 8, 1953.

Still another group comprises the epoxidized hydrocarbons, such as epoxidized vinyl cyclohexene, epoxidized 2,2-bis(4-cyclohexenyl)propane, epoxidized butadiene and the like, as well as epoxidized polymers of diolefins, such as butadiene.

The other component in the compositions of the present invention comprise the polyaminodiphenylsulfones. These are preferably the diaminodiphenylsulfones or mixtures thereof, such as 4,4'-diaminodiphenylsulfone, 3,4'-diaminodiphenylsulfone and 2,3-diaminodiphenylsulfone.

The compositions of the invention may be prepared by any suitable method. They may be prepared by mixing the two components together or by adding the two to a suitable solvent. If one of the components is a solid, they are preferably combined in a suitable solvent. However, the solid component may be mixed with the liquid component without the addition of solvents. If both of these components are solid, which is the situation in a great many cases, the components may be combined by fusing or hot milling or preferably by the use of a suitable solvent.

Examples of solvents that may be used in preparation of the new compositions include the volatile solvents that may escape from the composition, such as the ketones, like acetone, methyl ethyl ketone, methyl isobutyl ketone, isophorone, etc.; esters, such as ethyl acetate, butyl acetate, Cellosolve acetate, ethylene glycol monoacetate, methyl Cellosolve acetate; ether alcohols, such as methyl, ethyl or butyl ether of ethylene glycol or diethylene glycol; chlorinated hydrocarbons such as trichloropropane, chloroform, etc., ethers such as tetrahydrofuran and the like. These active solvents may be used in admixture with aromatic hydrocarbons, such as benzene, toluene, xylene and the like, and/or alcohols, such as ethyl, isopropyl or butyl alcohol. Other solvents include liquid monoepoxy compounds such as glycidyl allyl ether, glycidyl phenyl ether, styrene oxide, cyano-substituted hydrocarbons, such as acetonitrile, propionitrile, adiponitrile, benzonitrile and the like.

Although it is desirable to mix the polyaminodiphenyl-sulfone with the polyepoxide in approximately equivalent amounts, i.e., sufficient amine to furnish 1 amino hydrogen per epoxy group, the proportions may be varied widely. Thus, in general, there is used about 0.25 to 1.25 equivalents of the polyamine per epoxide group and the preferred proportion of the diamine mixed with the polyepoxide is such that there is present from 0.5 to 1.1 equivalents of polyamine per epoxide.

Various other ingredients may be mixed with the polyepoxides to be cured with the polyaminodiphenylsulfone, such as pigments, fillers, dyes, plasticizers, other resins and the like. As the polyaminodiphenylsulfones are sometimes slow in reacting, it is sometimes desirable to accelerate their reaction by the addition of activators such as small amounts, e.g. 0.1% to 3% by weight of the sulfone, of a $BF_3$ complex and preferably a $BF_3$-amine complex.

As noted above, the compositions of the invention may be heat-cured to form hard, insoluble products having excellent heat stability. The temperature used in the curing of the compositions will vary depending upon the particular polyepoxide selected. In general, temperatures of from 100° C. to 200° C. are sufficient. Particularly preferred temperatures range from about 100° C. to 175° C.

The compositions of the invention are particularly suited for use as adhesives. They may be used in the bonding of a variety of material, such as metal-to-metal, wood-to-wood, glass-to-glass, glass-to-metal, metal-to-plastic and the like. They are of particular value, however, in the bonding of metals, such as aluminum-to-aluminum or steel-to-steel. When applied as an adhesive, the compositions may simply be spread on the desired surface to form films of various thicknesses, e.g., 5 mils to 30 mils and then the other surface superimposed and heat applied.

When the compositions are used as adhesives for metal-to-metal bonding, it has been found advantageous to impregnate cotton, rayon synthetic fiber or glass cloth textiles with the compositions, and then use the impregnated textiles as a bonding tape for joining the metals. Such tapes provide convenient means for handling and using the compositions in adhesive applications. The tape is inserted between two metals desired to be joined, and the assembly is heated and baked to cure the resin whereby articles are obtained wherein the joined surfaces have excellent strength even at the elevated temperatures.

When used as adhesives, it is sometimes advisable to add to the novel compositions other components, such as polyvinyl acetal resins. These resins are acetals from reaction of an aldehyde and polyvinyl alcohol, which alcohol is normally derived from polyvinyl acetate. Many polyvinyl acetal resins are commercially available. Thus, a resin sold under the name of Formvar 15/95 E is a product derived from polyvinyl acetate and is made by replacing 95% of the acetyl groups by formal groups from formaldehyde, the original polyvinyl acetate being a substance which gives a benzene solution of 86% per liter having a viscosity of 15 centipoises at 20° C. Similarly, a resin known as Alvar 5/80 is a product derived from polyvinyl acetate wherein there is a 80% replacement of acetyl groups by acetal groups and the original polyvinyl acetate had a viscosity of 5 centipoises at 20° C. Preferred polyvinyl acetals to be used are the polyvinyl acetals derived from an alkanal of 1 to 4 carbon atoms. It is preferred that the resin be derived from polyvinyl acetate with from 50% to 100% of the acetyl groups replaced with the alkanol groups, which polyvinyl acetal resin had a molecular weight of about 20,000 to 100,000.

Another important application of the invention is the production of laminates or resinous articles reinforced with fibrous textile material. Although it is generally preferred to utilize glass cloth for this purpose, any of the other suitable fibrous materials in sheet form may be employed such as glass matting, paper, asbestos paper, mica flakes, cotton bats, duck muslin, canvas and the like.

In preparing the laminate, the sheets of fibrous material are first impregnated with the composition of the invention. This is preferably accomplished by dissolving the polyaminodiphenylsulfone in a solvent such as acetone and then mixing the solution with the polyepoxide so as to obtain a fluid mixture. The sheets of fibrous material are impregnated with the mixture by spreading it thereon or by dipping or otherwise immersing them in the impregnant. The solvent is conveniently removed by evaporation and the mixture is cured to the fusible resin stage. Although this operation may be conducted at room temperature (20° C. to 25° C.), it is preferred to use somewhat elevated temperature such as about 50° C. to 200° C. with the impregnated sheet stock passing through or hanging free in an oven or other suitable equipment. The resinification is arrested before infusible product occurs by cooling below about 40° C., preferably to about 20 to 25° C. A plurality of the impregnated sheets are then superposed and the assembly is cured in a heated press under a pressure of about 25 to 500 or more pounds per square inch. The resulting laminate is extremely strong and has excellent resistance to loss of strength at elevated temperatures.

Still another application is the use of the compositions of the invention in preparing pottings and castings which are required to withstand elevated temperatures. This is generally accomplished by applying the compositions of the invention to the desired mold and then applying heat and pressure as desired to effect the necessary cure.

To illustrate the manner in which the invention may be carried out, the following examples are given. It is to be understood, however, that the examples are for the purpose of illustration and the invention is not to be regarded as limited to any of the specific compounds or conditions recited therein. Unless otherwise specified, parts disclosed in the examples are parts by weight.

*Example I*

A heat resistant laminate was prepared from a polyglycidyl ether of 1,1,2,2-tetrakis-(4-hydroxyphenyl) ethane (epoxy value of 0.45 eq./100 g. and melting point of 85° C.) and 4,4'-diaminodiphenylsulfone in the following manner.

100 parts of the polyglycidyl ether of 1,1,2,2-tetrakis-(4-hydroxyphenyl)ethane was dissolved in acetone and 30 parts of 4,4'-diaminodiphenylsulfone added thereto. Glass cloth was impregnated with this material and the impregnated material dried at 240° F. for 20 minutes in an air oven. A laminate of 14 plies of the glass cloth was then prepared and cured for 5 minutes at 200° C. at contact pressure and then 25 minutes at 25 p.s.i. The resulting laminate was very strong and had excellent heat resistance. The tensile strength of the laminates at various temperatures is shown below:

| 200° C., p.s.i. | 250° C., p.s.i. | 300° C., p.s.i. | 500° C., p.s.i. |
|---|---|---|---|
| 90,800 | 63,800 | 43,000 | 5,900 |

*Example II*

Example I was repeated with the exception that the amount of diaminodiphenylsulfone was changed to 10 parts and 20 parts. In these cases, hard and heat resistant laminates were also obtained. The strength of the laminates at the various elevated temperatures is shown below:

| Amount of DDS (phr.) | | 200° C. | 250° C. | 300° C. | 500° C. |
|---|---|---|---|---|---|
| 10 | p.s.i. | 85,600 | 62,800 | 39,800 | 32,400 |
| 20 | p.s.i. | 78,500 | 62,900 | 45,200 | 20,000 |

*Example III*

This example illustrates the preparation of a heat resistant adhesive from the glycidyl ether of 1,1,2,2-tetrakis-(4-hydroxyphenyl)ethane and diaminodiphenylsulfone.

80 parts of a polyglycidyl ether of 1,1,2,2-tetrakis(hydroxyphenyl)ethane (as described in Example I) was dissolved in 55 parts of tetrahydrofuran. 20 parts of a glycidyl polyether of bis-phenol having a melting point of 156° C. (Epon 1009) was also added. 20 parts of polyvinyl formal (Formvar 5/95 E.), 100 parts of aluminum dust and 24.5 parts of diaminodiphenylsulfone were also added to the mixture. The resulting product was a thick syrup.

Glass cloth known as Fiberglas 106–Volan A was passed through the composition of about 60% solids content and scraped with blades to the desired thickness. The tape was then dried for 15 minutes at 200° F. to remove the solvent. Upon cooling of the adhesive composition, the resulting tape was wound with the use of cellophane barrier film. The adhesive tape was used to bond type 301 steel sheets of 0.05 inch thickness. The adhesive tape (without barrier film) was placed between two of the steel sheets to form a single one-half inch lap joint. The assembly was then placed in a press at 25 p.s.i. and cured for one-half hour at 240° C. and then at 330° F. for ½ hour. The tensile shear strength in p.s.i. of the bond was determined under various conditions. The results are shown in the table below.

Test conditions:              Tensile shear strength
    At room temperature, original _____ 4215
    At room temperature, after 500° F. aging for
      200 hours _____ 1800
    At 500° F. after 8 hours at 500° F. _____ 1280
    At 500° after 200 hours at 500° F. _____ 1360
    At −70° F. original _____ 3680
    At −70° F. after 500° F. aging, 8 hours _____ 1480
    At 500° F. after 400 hours at 500° F. _____ 1090

The above-noted value of 1090 p.s.i. is particularly outstanding as it is the highest value yet obtained on steel under these conditions.

The bend strength of the bond was also determined according to procedure described in Specification MIL-8431. The bend strength was 181–198 lbs. and after a post cure of 8 hours at 330° F. was 149 lbs.

*Example IV*

The preceding example was repeated with the exception that the amount of diaminodiphenylsulfone was changed from 24.5 to 29, 30 and 35.5. In each case bonds were obtained having the above-described superior properties. The bond prepared from the composition containing 29 parts of the diaminodiphenylsulfone, for example, had an original tensile shear strength of 4310 (77° F.) and a strength of 1325 at 500° F. after 200 hours at 500° F.

*Example V*

Example III was also repeated with the exception that the glass cloth was replaced with stainless steel woven wire (wire diameter of 0.0065 inch). In this case also bonds were obtained having the above-described superior properties, e.g., a shear strength of 1296 p.s.i. was obtained at a test temperature of 500° F. after the bond was exposed at 500° F. for 72 hours.

*Example VI*

83.3 parts of the polyglycidyl ether of 1,1,2,2-tetrakis-(4-hydroxyphenyl)ethane described in Example I was dissolved in 55 parts of tetrahydrofuran. 16.7 parts of polyvinyl formal (Formvar 5/95 E), 100 parts of aluminum dust and 30 parts of diaminodiphenylsulfone were also added to the mixture. The resulting product was a thick syrup.

Glass cloth was impregnated with the above mixture by the method shown in Example III and the adhesive used to bond steel as in Example III. The tensile shear strength in p.s.i of the bond was determined under various temperatures. The results are shown in the table below.

Test conditions: Tensile shear strength
At room temperature, original _____ 3555
At 500° F. after 8 hours at 500° F. _____ 1530
At 500° F. after 500° F. for 2200 hours ___ 1095

*Example VII*

Examples III and VI were repeated with the exception that the amount of aluminum powder filler was changed from 100 to 80, 110 and 120. In each case bonds were obtained having the above-described superior properties.

*Example VIII*

80 parts of glycidyl polyether of alpha,alpha,alpha',alpha'-tetrakis(hydroxyphenyl)-1,4-diethylbenzene (Epoxy value 0.463 eq./100 g.) was dissolved in 55 parts of tetrahydrofuran. 20 parts of Formvar 5/95 E, 100 parts of aluminum dust and 33 parts of diaminodiphenylsulfone were added to the mixture. The resulting product was a thick syrup.

Glass cloth was impregnated with the above composition and the resulting products used to bond steel. The bonds were cured as in Example III. The resulting adhesive bonds showed good heat resistance at 500° F. and improved heat resistance over that of the bond in Example III at 100° F. Shear strength was about 1200 p.s.i. at 500° F. and 400–500 p.s.i. at 600° F.

*Example IX*

80 parts of polyglycidyl ether of 1,1,5,5-tetrakis(hydroxyphenyl)-pentane (Epoxy value 0.514 eq./100 g.) was dissolved in 55 parts of tetrahydrofuran. 20 parts of Formvar 5/95 E, 100 parts of aluminum dust and 33 parts of diaminodiphenylsulfone were added to the mixture. The resulting product was a thick syrup.

Glass cloth was impregnated with the above composition and the resulting products used to bond steel. The bonds were cured as in Example III. The resulting adhesive bonds showed good heat resistance at 500° F. and at 600° F. Shear strength was approximately 800 p.s.i. and 400 p.s.i. respectively.

*Example X*

80 parts of 1,1,2,2-tetrakis(4-epoxypropoxy-3-epoxypropylphenyl) ethane having an epoxy value of 0.616 eq./100 g. was dissolved in 55 parts of tetrahydrofuran. 30 parts of diaminodiphenylsulfone and 100 parts of aluminum dust were added to the mixture. Glass cloth was impregnated with the above composition and the resulting product used to bond steel. The bond was cured as in Example III. The resulting adhesive bond had a tensile shear strength of 1080 p.s.i. at 500° F. after 500° F. aging for 8 hours.

*Example XI*

80 parts of 1,5-diglycidylphenyl glycidyl ether having an epoxy value of 0.945 eq./100 g. was dissolved in 55 parts of terahydrofuran. 30 parts of diaminodiphenylsulfone and 100 parts of aluminum dust were added to the mixture. Glass cloth was impregnated with the above composition and the resulting product used to bond steel. The bond was cured as in Example III.

*Example XII*

80 parts of alpha,alpha,alpha',alpha'-tetrakis(4-epoxypropoxy-3-epoxypropylphenyl)1,4-diethyl benzene having an epoxy value of 0.563 eq./100 g. was dissolved in 55 parts of tetrahydrofuran. 30 parts of diaminodiphenylsulfone and 100 parts of aluminum dust were added to the mixture. Glass cloth was impregnated with the above composition and the resulting product used to bond steel. The bond was cured as in Example III. The resulting adhesive bond had an initial shear strength of 1330 p.s.i. at 520° F.

*Example XIII*

85 parts of the polyglycidyl ether of 1,1,2,2-tetrakis(4-hydroxyphenyl)ethane defined in Example I was combined with 15 parts of epoxidized glycidyl ether of allylphenol, 20 parts of Formvar 15/85 E, 60 parts of aluminum dust filler. 20 parts of diaminodiphenylsulfone was added to the above mixture at 185° F. The melt was cast between cellophane and pressed to a thickness of 10 mils. Bonds to a half-hard type 301 steel were prepared with the unsupported tape and cured in a press (100 p.s.i.) for one-half hour at 240° F. plus one-half hour at 330° F. Adhesive shear strength of 3410 p.s.i. at 77° F. A related one prepared with dicyandiamide in place of the diaminodiphenylsulphone only 2665 at 77° F.

I claim as my invention:

1. A composition of matter comprising a polyepoxide having a

epoxy value of at least 0.45 eq./100 g. and at least 0.25 equivalent of a diaminodiphenylsulfone wherein two phenyl rings are entirely aromatic and two amino groups are the only reactive substituents attached to the said phenyl rings, an equivalent amount of sulfone being that sufficient to furnish one amino hydrogen per epoxy group.

2. A composition as in claim 1 wherein the diaminodiphenylsulfone is 4,4'-diaminodiphenylsulfone.

3. A composition as in claim 1 wherein the polyepoxide is a glycidyl ether of an alpha,alpha,omega,omega-tetrakis(hydroxyaryl)alkane.

4. A composition as in claim 1 wherein the polyepoxide is an ether of a poly(vic-epoxyalkyl) substituted phenol.

5. A composition as in claim 1 wherein the polyepoxide is a glycidyl ether of a novolac resin obtained by reacting formaldehyde with 2,2-bis(4-hydroxyphenyl)propane.

6. A composition comprising a polyepoxide having a

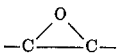

epoxy value of at least 0.45 eq./100 g. and from .9 to 1.5 equivalents of a diaminodiphenylsulfone wherein the two phenyl rings are entirely aromatic and the two amino groups are the only reactive substituents attached to the said phenyl rings, an equivalent of the sulfone being that amount sufficient to furnish one amino hydrogen per epoxy group.

7. A composition as in claim 6 wherein the diaminodiphenylsulfone is a mixture of isomeric diaminodiphenylsulfones.

8. An adhesive composition comprising a polyepoxide having a

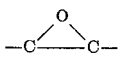

epoxy value of at least 0.45 eq./100 g., an inert filler, a polyvinyl acetal, and at least 0.25 equivalent of a diaminodiphenylsulfone wherein the two phenyl rings remain entirely aromatic and wherein the two amino groups are the only reactive substituents attached to the phenyl rings, an equivalent amount of the sulfone being that sufficient to furnish one amino hydrogen per epoxy group.

9. A composition comprising a polyglycidyl ether of 1,1,2,2-tetrakis(4-hydroxyphenyl)ethane and at least 0.25 equivalent of 4,4'-diaminodiphenylsulfone, an equivalent amount of the sulfone being that sufficient to furnish one amino hydrogen per epoxy group.

10. A hard insoluble infusible product obtained by heating the composition defined in claim 1 to a temperature of at least 80° C.

11. A hard insoluble infusible product obtained by heating a composition of claim 9 to a temperature between 100° C. and 200° C.

12. A process for preparing a product having improved heat stability which comprises heating a mixture containing a polyepoxide having a

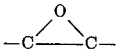

epoxy value of at least 0.45 eq./100 g. and at least 0.25 equivalent of a diaminodiphenylsulfone wherein the two phenyl rings remain entirely aromatic and wherein the two amino groups are the only reactive substituents attached to the phenyl rings, to a temperature above 80° C., an equivalent amount of the sulfone being that sufficient to furnish one amino hydrogen per epoxy group.

13. A process for preparing a product having improved heat stability which comprises heating a mixture containing a glycidyl ether of alpha,alpha,omega,omega,tetrakis(hydroxyaryl)alkane having an epoxy value of at least 0.45 eq./100 g. with from 0.25 to 1.5 equivalents of a diaminodiphenylsulfone wherein the two phenyl rings are entirely aromatic and the two amino groups are the only reactive substituents attached to the said phenyl rings, an equivalent amount of the sulfone being that sufficient to furnish one amino hydrogen per epoxy group.

14. A composition comprising a mixture of a glycidyl polyether of a polyhydric compound having a 1,2 epoxy equivalency greater than 1.0, said compound being selected from the group consisting of polyhydric alcohols and polyhydric phenols and from about 25% to 125% of the equivalent amount of a diaminodiphenyl sulfone curing agent in which two phenyl groups are linked at one position by a sulfonyl group and are each substituted at another position by an amino group, said phenyl groups being otherwise unsubstituted, said equivalency being based on one replaceable amino hydrogen atom per epoxy group, said mixture curing to a solid resinous product upon heating.

References Cited in the file of this patent
UNITED STATES PATENTS

| | | |
|---|---|---|
| 2,713,567 | Scheibli | July 19, 1955 |
| 2,817,644 | Shokal | Dec. 24, 1957 |